Jan. 1, 1929.                                              1,697,153
             W. H. WADDINGTON
               ROOFING FASTENER

Filed Aug. 19, 1927          2 Sheets-Sheet 1

INVENTOR
William H. Waddington
By  Green & McCallister
    His Attorneys

Jan. 1, 1929.                                     1,697,153
W. H. WADDINGTON
ROOFING FASTENER
Filed Aug. 19, 1927            2 Sheets-Sheet 2
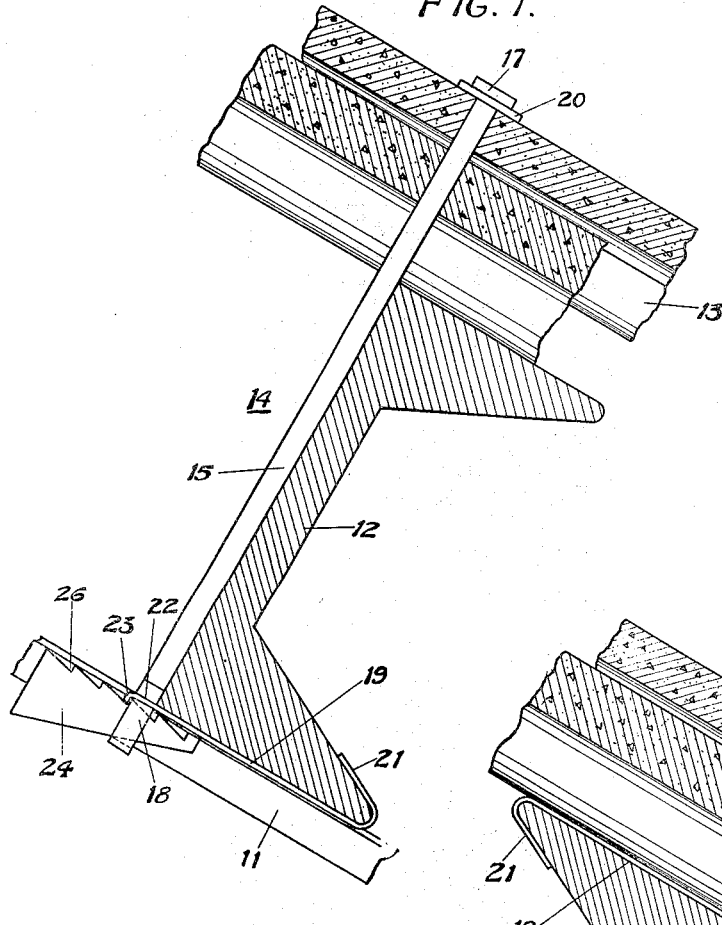
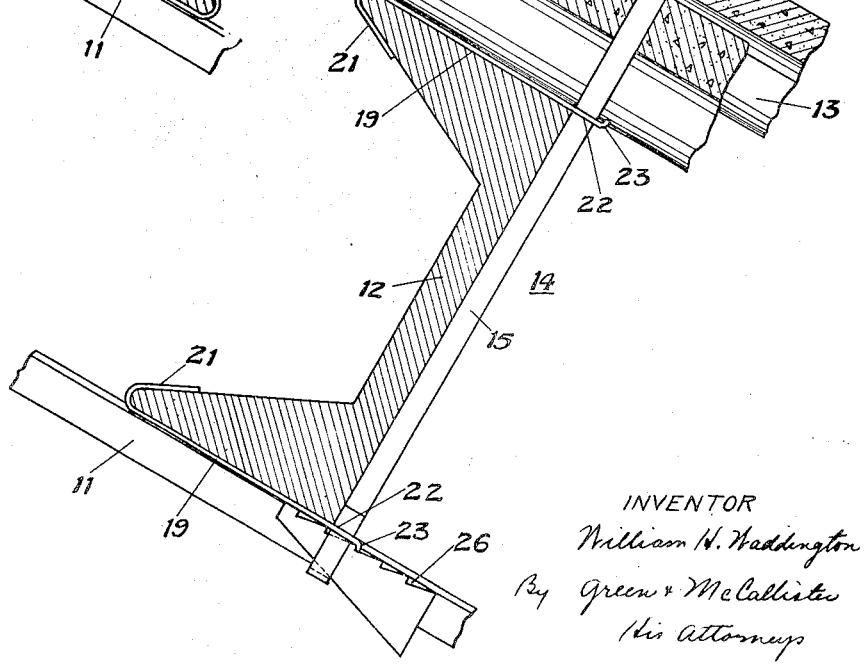
INVENTOR
William H. Waddington
By Green & McCallister
His Attorneys Patented Jan. 1, 1929.

1,697,153

UNITED STATES PATENT OFFICE.

WILLIAM H. WADDINGTON, OF EAST ORANGE, NEW JERSEY, ASSIGNOR TO ALLEGHENY STEEL COMPANY, A CORPORATION OF PENNSYLVANIA.

ROOFING FASTENER.

Application filed August 19, 1927. Serial No. 214,202.

This invention relates to roofing fasteners and more particularly to fasteners for securing flat or corrugated material to the flanges of a metal roof purlin.

An object of this invention is to provide a roofing fastener made from stainless or non-rustable materials adapted to firmly secure a roofing to an angle-iron purlin.

Stainless or non-rustable materials are very expensive; nevertheless, roofing fasteners made from such materials are obviously more desirable than roofing fasteners made from materials subject to rusting and corrosion.

Another object of this invention is to provide a roofing fastener made from stainless or non-rustable materials in such a manner as to limit the amount of material used to a minimum, avoiding the expense of machining, etc., that shall firmly secure a roofing to a purlin.

A further object of this invention is to provide such a roofing fastener that shall be easy to install and materially expedite the installation of a roof.

These and other objects that may be made apparent throughout the further description of this invention are attained by means of the fastener hereinafter described and illustrated in the accompanying drawings wherein, Figures 1 and 2 are elevational views of a metal strip embodied in the invention taken at 90 degrees one to the other.

Fig. 7 is a fragmental view of a structure illustrating the invention as applied in use, and, Fig. 8 is a similar view to Fig. 7 showing a slightly different embodiment of the invention.

Figures 1, 2:
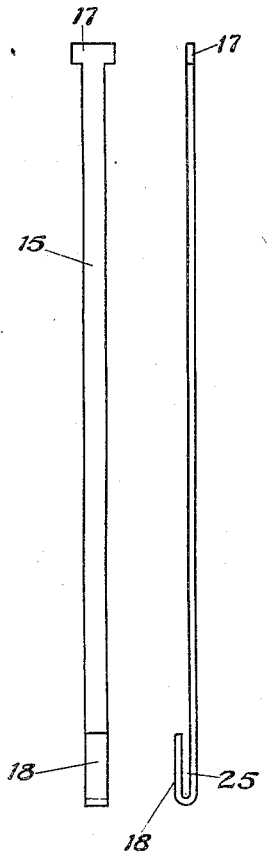

In the drawings, 11 is a steel roof rafter for supporting the usual steel purlin 12 which in turn supports the roofing 13. The roofing fastener, represented in its entirety by 14, is adapted for securing sheet roofing such as asbestos and the like to the steel purlin 12.

Figure 3:
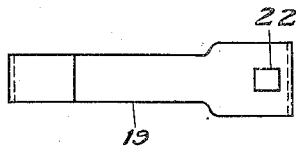
Figs. 3 and 4 are elevational views of a J clip embodied in the invention taken at 90 degrees one to the other.
Figure 4:
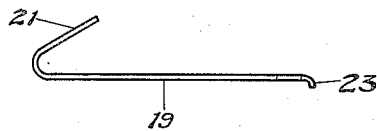
Figures 5, 6:
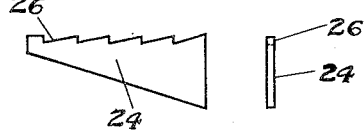
Figs. 5 and 6 are elevational and end views respectively of a wedge embodied in the invention.

Figs. 1 to 6 inclusive illustrate the roofing fastener 14 in detail. The roofing fastener comprises a metal strip 15 having a head portion 17 on one of its ends and its other end terminating in a re-entrance portion 18, a J clip 19, having one of its ends terminating in a curved portion 21 for engaging a flange of the purlin 12, and an opening 22 for receiving the strip 15 adjacent its other end, this end terminating in a flange portion 23 at substantially right angles to the plane of the main body portion of the J clip 19 and in opposite direction to the curved portion 21. A wedge 24 is provided for cooperating with the groove 25 formed by the re-entrance portion 18 of the metal strip 15 for maintaining the roofing fastener 14 in fixed relation with the purlin 12, and a washer 20 for the head portion 17 (see Fig. 7).

The metal strip 15, J clip 19, washer 20 and wedge 24 are made from stainless and non-rustable materials, preferably from a material known as Ascoloy.

Referring particularly to Fig. 7, the metal strip 15, having the washer 20 placed thereon, is disposed through the roofing 13 and lies along the straight side of the purlin 12. The lower portion of the metal strip 15 and the re-entrance portion 18 extend through the slot 22 in the J clip 19, which is fastened around the lower flange of the purlin 12 by means of curved portion 21. The wedge 20 which is provided with a plurality of notches 26 disposed on its straight side, engaging and cooperating with the flange portion 23 on the J clip 19, is positioned in the groove portion 25 of the metal strip 15 for securing the strip 15 and clip 19 in fixed relation with the roofing 13 and the purlin 12.

The groove 25 is so positioned in the strip 15 as to permit the flat side of wedge 24 containing the notches 26 when forced therethrough to press against the straight side of the J clip 19 and after the wedge 24 is driven into the groove 25 the strip 15 and the J clip 19 are cammed into rigid fixed relation. The flange portion 23 of the J clip 19, engaging with the cooperating notches 26 in the wedge, locks the fastener to the purlin 12, thus rigidly securing the roofing 13 to the purlin 12.

Fig. 8 shows a slightly different use of the fastener wherein a J clip is used on both the upper and lower flanged portions of the purlin 12. In this illustration the purlin is reversed from that illustrated by Fig. 7 and it can be appreciated that with the purlin reversed there would be a tendency for the roofing to slide away from the side of the purlin. This tendency is overcome by employing a J clip 19 about each of the flanged portions of purlin 12 and extending the strip 15 through the slot 22 of each of the J clips 19. It can be seen from Fig. 8 that by employing two J clips as stated above, the roof is prevented from sliding as well as being maintained in rigid fixed relation to the purlin.

J clips 19 may be used at both the upper and lower flange portions of the purlin 12 in the structure illustrated by Fig. 7 but since the strip 15 is positioned on the upper side of the purlin it will prevent any sliding of the roof.

While I have illustrated and described this roofing fastener in connection with a channel purlin, it will be apparent to those skilled in the art that the fastener is also applicable to an I beam purlin as well and other changes, modifications, substitutions, additions and omissions may be made without departing from the spirit and scope of the appended claims.

What I claim as new and desire to secure by Letters Patent is:

1. In a device for fastening roofing to an angle-iron purlin the combination with a metal strip passing through a hole in the roofing extending across the face of one flange of the purlin and provided with a groove, of a J clip having an opening for receiving the strip, one of its ends terminating in a curved portion for engaging the flange of the angle-iron, and it other end terminating in a flange portion, and a wedge for cooperating with the groove and the flange portion for maintaining the roofing in fixed relation to the purlin.

2. The combination with a frame work of a roof, a non-rustable roofing fastener composed of a metal strip extending through the roofing having a head on one of its ends and a groove adjacent its other end, of a J clip adapted to engage the frame work of a roof having a slot adjacent one of its ends for receiving the groove, and a wedge for the groove.

3. In combination, a metal strip having a head on one of its ends and a slot adjacent its other end, a J clip having its opposite ends terminating in oppositely disposed curved portions and an opening for receiving the strip, and a wedge for the slot having a plurality of notches for engaging one of the said curved portions of the J clip.

4. In combination, a metal strip having a head on one of its ends and its other end terminating in a re-entrant portion forming a groove, a J clip having an opening for receiving the groove, and a wedge for the groove, the said wedge having a plurality of notches for engaging one end of the J clip.

5. In combination, a non-rustable roofing fastener composed of a metal strip having a head portion on one of its ends and its other end terminating in a re-entrant portion forming a groove, a metal J clip having an opening for receiving the re-entrant portion, and a metal wedge for the groove.

In testimony whereof, I have hereunto subscribed my name this 16th day of August, 1927.

WILLIAM H. WADDINGTON.